United States Patent
Palmer et al.

(10) Patent No.: US 12,034,876 B2
(45) Date of Patent: Jul. 9, 2024

(54) TEMPERATURE INDEPENDENT PHYSICALLY UNCLONABLE FUNCTION DEVICE

(71) Applicant: TTP Plc., Royston (GB)

(72) Inventors: Timothy John Palmer, Royston (GB); Michael Beck, Royston (GB)

(73) Assignee: TTP PLC, Royston (GB)

(*) Notice: Subject to any disclaimer, the term of this patent is extended or adjusted under 35 U.S.C. 154(b) by 120 days.

(21) Appl. No.: 17/620,401

(22) PCT Filed: Jun. 18, 2020

(86) PCT No.: PCT/GB2020/051474
§ 371 (c)(1),
(2) Date: Dec. 17, 2021

(87) PCT Pub. No.: WO2020/254809
PCT Pub. Date: Dec. 24, 2020

(65) Prior Publication Data
US 2022/0239505 A1 Jul. 28, 2022

(30) Foreign Application Priority Data

Jun. 18, 2019 (GB) .................................... 1908680

(51) Int. Cl.
*H04L 9/32* (2006.01)
*H01L 23/00* (2006.01)

(52) U.S. Cl.
CPC ............ *H04L 9/3278* (2013.01); *H01L 23/57* (2013.01); *H04L 2209/12* (2013.01)

(58) Field of Classification Search
CPC ... H04L 9/3278; H04L 2209/12; H01L 23/57; G09C 1/00
See application file for complete search history.

(56) References Cited

U.S. PATENT DOCUMENTS

| | | | |
|---|---|---|---|
| 3,567,641 A | 3/1971 | Ross et al. | |
| 8,516,269 B1 * | 8/2013 | Hamlet | G06F 21/445 713/180 |
| 9,390,295 B2 | 7/2016 | Franciscus Widdershoven et al. | |
| 10,164,640 B1 * | 12/2018 | Lu | G11C 16/045 |

(Continued)

OTHER PUBLICATIONS

PCT Patent Application PCT/GB2020/051474 International Search Report and Written Opinion issued Sep. 14, 2020.

*Primary Examiner* — Ellen Tran
(74) *Attorney, Agent, or Firm* — Erise IP, P.A.

(57) ABSTRACT

A physically unclonable function (PUF) device comprises a plurality of conductors, at least some of which are arranged so that they interact electrically and/or magnetically with one another. A media surrounds at least a portion of each of the conductors and a plurality of temperature compensation particles are arranged throughout the media, where the temperature compensation particles have a temperature coefficient selected such that they compensate for temperature-related effects in the PUF device by making the permittivity and/or permeability of the media substantially temperature independent. Circuitry applies an electrical challenge signal to at least one or the conductors and receives an electrical output from at least one of the other conductors to generate an identifying response to the challenge signal that is unique to the device.

14 Claims, 3 Drawing Sheets

(56) References Cited

U.S. PATENT DOCUMENTS

| | | | |
|---|---|---|---|
| 2011/0254141 A1* | 10/2011 | Roest | G06F 21/73 |
| | | | 257/E29.342 |
| 2014/0159040 A1 | 6/2014 | Dimitrakopoulos et al. | |
| 2015/0071431 A1* | 3/2015 | Zhu | G11C 11/1695 |
| | | | 365/158 |
| 2016/0188296 A1* | 6/2016 | Plusquellic | H04L 9/0866 |
| | | | 708/190 |
| 2018/0277198 A1* | 9/2018 | Tseng | G11C 17/16 |

* cited by examiner

TEMPERATURE INDEPENDENT PHYSICALLY UNCLONABLE FUNCTION DEVICE

RELATED APPLICATIONS

The present application is a national stage application under 35 U.S.C. § 371 of International Application No. PCT/GB2020/051474, filed 18 Jun. 2020, which claims priority to Great Britain Patent Application No. 1908680.0, filed 18 Jun. 2019. The above referenced applications are hereby incorporated by reference.

BACKGROUND

The present invention relates to a Physically Unclonable Function (PUF) device that maps an input (challenge) to an output (response) that is well-defined but difficult to duplicate or reverse-engineer. The invention has applications within device security, authentication, counterfeit protection and tamper-proofing. In particular the PUF device of the present invention has an improved temperature stability over its range of operation compared to conventional PUF devices.

Existing Physically Unclonable Functions (PUFs) typically exploit manufacturing differences between identical silicon circuits, however these lack sufficient entropy to be truly unclonable. Alternative PUF types do exist, but these require external read-out circuitry, and are vulnerable to 'black-box' attacks. The proposed invention avoids these issues by providing a novel method of generating an intrinsic response, based on physical characteristics that cannot be easily modelled.

Cryptographic primitives used in encryption assume 3 key features: Secure Key Generation, Secure Key Storage and Secure Execution. Analysis has shown a distinct lack of randomness in commonly used public keys, whilst the contents of said keys can be read directly from non-volatile digital memory even with extensive countermeasures.

Current methods of generating and storing these keys in memory, in such a way that protects them from common types of attack, are both difficult and expensive. PUFs offer new cost-effective ways through which these keys can be securely generated and protected from malicious actors. They were first proposed with a view to identifying individual ICs by their manufacturing defects. PUFs work by generating a key that is unique to the device, based on some physical characteristic of the device itself. The key is generated and read out by challenging the PUF, measuring the response and then performing some form of computation.

As the key is generated by the physical characteristics and manufacturing variabilities of the device, it should be impossible to create a physical copy or accurately model the response of the system to simulate it in software. If some individual attempts to measure the response of the PUF when subject to a challenge, the response should change sufficiently to invalidate the PUF, and protect the secret contained within the PUF. The lack of interchangeability between the challenges and responses leads to the idea of the Challenge-Response Pair (CRP)—each challenge maps directly to one response.

As the ideal PUF cannot be copied or modelled, it is truly unclonable, and so a key generated or stored by the PUF cannot be illegitimately extracted/copied. Additionally, the generated response must be reproducible, once variations in environmental conditions, such as temperature and humidity are accounted for, and the time to generate a response should be neither too fast (reducing the time required to collect CRPs for a brute force attack) or too slow (reducing the availability of any function relying on the PUF).

PUFs have many applications:

Remote Challenge-Response Authentication: A simple example of this is password authentication, where the challenge is the request and the response the correct password. In the case of a PUF, one or more CRPs would be collected from the device during a registration stage. The device can subsequently be checked for authenticity by issuing a challenge and getting the desired response in return. The correct responses are not stored within the PUF, but are generated as a function of its physical structure, so the PUF is inherently robust to invasive attacks (that may attempt to read stored secrets). Many challenge-response pairs could be registered, so that each pair would only need to be used once (a one-time password), meaning that the system would be robust against replay attacks. The system doesn't require continuous power, or time synchronisation, unlike other 1-time authentication systems.

Encryption Relationship Management: The response of the PUF to a given challenge could be used to form a private encryption key. Again, the key would not be stored within the PUF itself, rendering it robust to invasive attacks.

Encryption Key Storage: Consider a situation where a field-programmable gate array (FPGA) is used to perform a custom process, and utilises an encrypted stream requiring the physical storage of a private key. This private key may therefore be vulnerable to a physical attack. By generating the key each time it is required, thus not storing it in electronic memory, the key is no longer vulnerable to unauthorised read-out.

Object Authenticity Verification: In this use-case, the PUF may either be embedded within the object to be verified, with some sort of external readout mechanism, or alternatively, the PUF may entirely enclose the physical object to be protected, and the challenge-response mechanism may be used to either ensure that the enclosed physical object has not been tampered with, or even to provide the code to a physical unlocking mechanism, which requires a complete challenge-response pair to unlock. Any attempt to interfere with the enclosure should change the response of the PUF and then be obvious to the possessor of the correct challenge-response pair(s).

However, current PUFs can either be accurately modelled or lack sufficient entropy to act as a true security layer for secure key storage. PUFs exploiting manufacturing differences within a FPGA are too easily measured using low-cost equipment and modellable; the secure keys generated using initial SRAM states are too easily read-out; and current EM-based PUFS are expensive and/or have a limited number of challenge-response pairs, allowing for potential replay attacks.

Furthermore, as PUFs typically exploit the micro-scale variations inherent within the device manufacturing process as the source of randomness to generate the device unique response, they tend to exhibit a strong dependence on environmental conditions such as temperature.

Up to this point, the majority of use-cases considered for PUFs have looked at their implementation within a comparatively small, well-defined temperature range. Conventional techniques to counter the effect of the operating environment on the PUF response, and hence to re-create the response from a noisy measurement, include the use of "helper-data" to map the measured PUF response back to its closest noiseless value. Whilst such techniques have been proven to work in biometric authentication, they necessarily reduce the entropy pool from which the PUF can generate a response, thereby reducing a PUF's applicability for device security applications. There is a need therefore for a PUF device which can operate across a wider temperature range than current PUF devices whilst maintaining its application to secure encryption

SUMMARY

Embodiments of the PUF of the invention can solve these issues as:
- The number of Challenge-Response pairs is large, based on the selection of conductors in the PUF, and the signal frequency, phase and amplitude.
- The full challenge-response mechanism can be enclosed within the PUF, preventing external measurement of the PUF properties.
- The PUF cannot be readily modelled due to the complex interaction of the conducting paths embedded within the surrounding media.
- The interaction of the conducting paths can be made even more complex and unpredictable in embodiments by using a heterogeneous media having an irregular nature surrounding the conducting paths.
- Any attempt to probe the PUF will affect the measured response.
- The PUF can be used to encapsulate any sensitive electronics, reducing the opportunity for an adversary to measure the PUF output.
- The incorporation of micro- and nano-particles with permittivities and permeabilities which self-compensate with respect to temperature across a wide temperature range reduces the reliance of the PUF on conventional techniques to counter environmental effects.
- The use of these temperature compensation particles can also improve the resilience of a PUF to conventional temperature-based attacks whilst increasing the operating temperature stability over the range of operation of the device.

There are several examples that constitute prior art in the field of PUFs. These show methods to implement PUFs on FPGAs and derive the true response from a noisy output. One example is U.S. Pat. No. 9,390,295, which relates to a capacitive security shield PUF. Whilst the option to choose the paths upon which to measure the response is disclosed in this prior art, the present invention has a greater configurability as it provides a PUF whose challenge can be modulated in frequency, amplitude and phase, increasing the number of possible CRPs and the effective entropy of the device.

The proposed invention exploits the interaction of multiple conducting paths embedded within a media, such that there exists a complex electrical and magnetic coupling between each permutation of the conducting paths.

The invention exploits the intrinsically complex and unpredictable electrical and magnetic interactions between numerous conductive paths and the media in which they are embedded. A subset of the conductive paths is excited by a modulated signal of selectable amplitude, frequency and phase generating the challenge, and the response is detected on some other paths. The nature of the PUF means that it can also be deployed in a variety of form factors, including enveloping a circuit to be protected. Any attempt to penetrate this protective circuit, or to listen to the challenge-response pairs, will invoke a sufficient change in the electrical and magnetic interaction between conductive paths to invalidate the response of the PUF. The media and arrangement of the conducting paths should be sufficiently different between devices to ensure that each PUF is unique, whilst also maintaining the unpredictability of the PUF response.

The invention also exploits the combination of materials with different temperature coefficients of permittivity and/or permeability to mitigate the effects of temperature on the response of a PUF to a given challenge over its operating temperature range.

In a preferred embodiment, the electrical and magnetic interactions are made more complex through the explicit introduction of heterogeneity in the surrounding media, for example through irregular distribution of some material through at least a part of the surrounding media. An example would be to introduce localised regions of iron filings within the media, however the addition of any suitable conductive, dielectric, ferroelectric, magnetic or ferromagnetic material or localised doping of the media, or combinations thereof, will explicitly introduce heterogeneity into the surrounding media. Further complexity arises from the use of non-linear and/or anisotropic materials thus distributed through the media. Temperature compensation particles may be introduced to the media in addition to, or instead of, the heterogeneity increasing material in order to further increase the complexity of the interactions and device.

According to the present invention, there is provided a physically unclonable function (PUF) device comprising:
- a plurality of conductors, at least some of which are arranged so that they interact electrically and/or magnetically with one another;
- a media surrounding at least a portion of each of the conductors;
- circuitry for applying an electrical challenge signal to at least one of the conductors and for receiving an electrical output from at least one of the other conductors to generate an identifying response to the challenge signal that is unique to the device; and
- a plurality of temperature compensation particles arranged throughout the media, the temperature compensation particles having a temperature coefficient selected such that they compensate for temperature-related effects in the PUF device by making the permittivity and/or the permeability of the media substantially temperature independent.

BRIEF DESCRIPTION OF THE DRAWINGS

Examples of the present invention will now be described with reference to the accompanying drawings.

DETAILED DESCRIPTION

Figure 1:
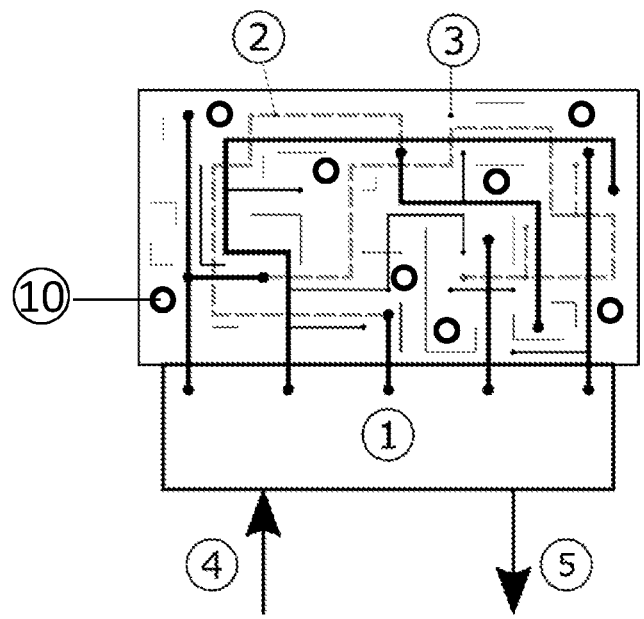
FIG. 1 shows a schematic diagram of an example PUF device according to the invention.

FIG. 1 shows a simplified conceptual diagram of the PUF network, with a reduced number (eg. five) of conducting paths 2 spread across two layers (solid black and dashed grey). The surrounding media 3 is, in this example, heterogeneous and is different for each PUF. Temperature compensation particles 10 (not shown) are arranged throughout the surrounding media 3 in order to introduce further heterogeneity whilst also compensating for temperature-related effects in the PUF. The PUF interface circuitry 1 applies electrical stimuli to a subset of the conducting paths. The interface circuitry 1 or an external challenge input 4 determines the selection of paths; and amplitude, phase and frequency of the stimuli applied to these paths.

The currents induced, in response to the challenge, within a different subset of conducting paths are received by the circuitry 1 and provide an identifying response 5 which is output from the PUF. The output 5 will be application specific, derived from the behaviour of the PUF 2, 3 and inference by circuitry 1.

Construction of the PUF Element

The conducting paths may be arranged such that all paths have a good probability of interacting in the absence of the heterogeneous media. This arrangement of the conducting paths ensures that the response of the PUF instantiation is unpredictable. The arrangement of the paths may be calculated by an optimisation algorithm whereby the cost function is related to the deviation of the integrated path couplings. The path routing may also be changed between different instantiations of the PUF, provided the integrated coupling along the lengths of each path to all others is sufficient to provoke a complex, non-predictable, tamper-proof response.

The conducting paths may comprise electrically insulated wires overlapping one another; be embedded within a substrate material with vias to allow for overlapping routing; or be formed from a complex media of mixed permittivity, permeability and conductivity. The heterogeneous media surrounding the conductors may then be applied in the form of some setting material such as epoxy, or by 'doping' existing substrate material such as FR4.

PUF Interfacing

The interface circuitry 1 between the PUF device and any application may be application specific. In a digital circuit, the challenge and response may be digital signals, which might be converted into analogue stimuli by the PUF interface. Alternatively, the challenge and response could themselves be analogue, in which case they may not need conversion before being transmitted to the conducting paths.

The circuity 1 for encoding challenges into the appropriate waveforms may be implemented as an Application Specific Integrated Circuit (ASIC), or by a combination of commercial off-the shelf components enclosed within the effective tamperproof region. This may also provide control access to the PUF, reducing the effectiveness of 'brute force' attacks by limiting the number of challenge-response pair requests within a given period.

Figure 2:
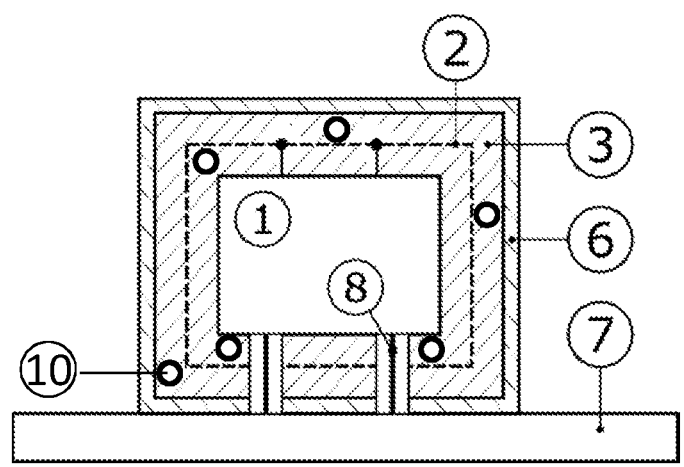
FIG. 2 shows a schematic diagram of an example stand-alone PUF device according to the invention.

In one embodiment, the PUF device may be a self-contained, standalone element. This is shown in FIG. 2. In this arrangement, the PUF is protecting the relationship that maps challenges to responses, i.e. the control electronics 1 for the PUF. The PUF interface 1 is contained within the PUF network (the conducting paths 2 in heterogenous media 3). It is difficult to reproduce the precise arrangement and nature of the conducting paths within the heterogeneous media, making it difficult to clone the PUF. Containment 6 may be provided to surround the PUF, and provide physical protection/robustness. This can also include a metallic component/ground plane to inhibit electrical measurement of the PUF. This containment element is not essential to operation of the PUF device however. The PUF device is shown mounted on a supporting structure 7, such as a printed circuit board) for clarity, although this is not key to operation of the PUF, and is not essential. Interconnects 8, pass through the heterogeneous media and containment to the circuit board to allow for communication between the PUF and the application circuit.

Figure 3:
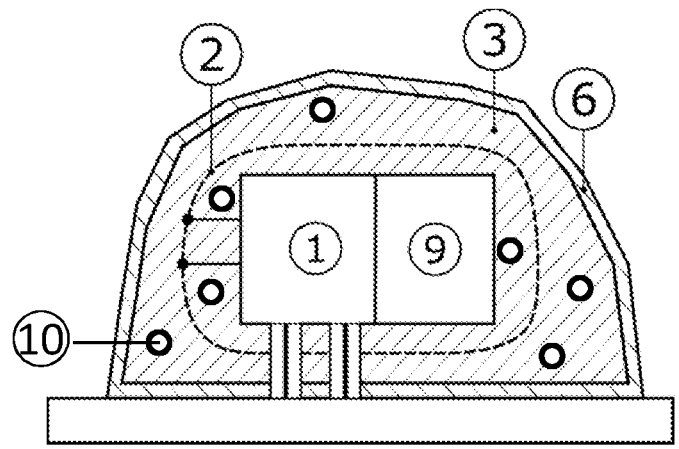
FIG. 3 shows a schematic diagram of an example PUF according to the invention which encases other components.

In another example, the PUF network may be used to fully/partially enclose other elements to provide protection to those elements, this is shown in FIG. 3. The PUF interface 1 and other protected components 9 are contained within the PUF network 2,3. For example, the protected components could be a microprocessor and encrypted storage module. In this case, the PUF can be used to generate the encryption key for the storage module. The PUF network has been formed around the interface electronics and protected components, and is connected to the interface internally. Attempts to disassemble or probe inside the PUF will cause a change in the electrical properties of the PUF network, leading to a change in the response generated for a given challenge, and preventing decryption of the storage module. Communication with the rest of the circuit can then be performed via the interconnects to the PCB.

If the control electronics are embedded within the PUF, they should also include means to correct any errors to ensure a repeatable key is produced within the required response time. This may be fuzzy logic, such as a fuzzy extractor, that ensures that small changes in the physical response (e.g. noise) do not lead to changes in the response.

In both FIGS. 2 and 3, the PUF element is shown as a dashed line to illustrate how it encloses the components to be protected. However, in a practical implementation the conducting paths 2 would extend to the edges of the heterogeneous media 3, with secondary conduction paths (due to the media and any additives) extending throughout the entire volume of the media.

The entire device may be fixed to a solid structure, or made flexible and shaped to the desired form factor for the initial registration process. The material and substrate selection may also be altered to adjust the entropy of the system, and to meet other constraints of the system such as thermal control. The device may then be also enclosed within a ground plane, forming a Faraday cage, to shield the unit from external electromagnetic interference and prevent side-channel attacks on the unit.

In use the PUF is passed a challenge from an external circuit via the PUF Interface 1. The interface 1 converts the request, which could be received as a serial command, to a challenge which can be fed into the PUF device. For example, in an instantiation with ten conducting paths, four may be stimulated with a signal (of varying waveform shape, frequency, amplitude and phase offset), with the response measured on any number of the other six paths. The presence of non-linear materials, such as ferro-magnetics, within the heterogeneous media will introduce a dependency of the response to the amplitude of the challenge. Furthermore, eddy currents within the media will alter the response detected by an individual conductor and introduce frequency dependence. The amplitude at the given stimulus frequency on each of the response wires is then converted into a response vector, which may then be converted back to a serial stream via the PUF interface 1 and fed back to the circuit. A serial example is provided here, but may also be implemented by a parallel bus or any other electrical interface circuitry.

Between challenges, the number of paths involved in the challenge may change, as may the number of paths used to detect the response. The specific paths used within each challenge may be changed, or kept the same between different challenges. Similarly, the conductors 2 used to detect the response may also change between each challenge.

The frequencies of conductor excitation may be in the audio range, utilising low cost and readily available transmit/receive electronics, or may operate at higher frequencies to develop a more complex electromagnetic interaction in which time delays become significant, and at which physical effects such as the skin effect play a large role in the interaction between the conductors.

If an adversary attempts to probe the PUF device to measure the electrical characteristics of the instantiation, the presence of the probe should cause a sufficient deviation of the response for a given challenge to invalidate the PUF, and render the device temporarily unreadable.

The initial registration process will be dependent on the use of the proposed invention, but is a necessary step to use the PUF device in a practical implementation. For remote authentication, the challenge-response pairs may be queried and stored securely during a registration process. For secure key storage, this is a one time and irreversible procedure.

As previously noted, environmental factors such as temperature may influence the response of the PUF. This can be mitigated through the introduction of temperature compensation particles into the PUF. Factors such as humidity can be mitigated by instantiating the PUF within a hermetically sealed enclosure. Measurements of other parameters, for example by use of a thermocouple in the control ASIC, may then be used in the generation of a challenge to the PUF. Furthermore, the temperature of the PUF can be locally controlled as part of the challenge process, further increasing the difficulty of modelling the PUF device response.

Temperature Compensation Particles

A temperature compensation particle, as employed in the present invention, is a particle which has a property (or properties) which are substantially temperature independent and when introduced into a PUF device they improve its resilience to the effects of temperature and thereby increase the device's operating temperature range.

Examples of the temperature independent properties are permittivity and permeability. In the case of the property being permittivity, the particle will have a temperature coefficient of permittivity close to zero while in the case of the property being permeability the particle will have a temperature coefficient of permeability close to zero.

Figure 4:
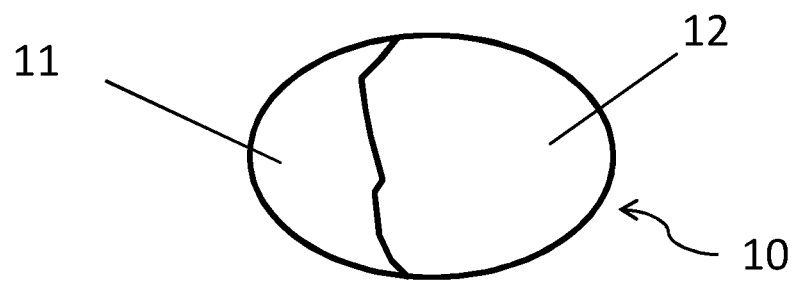
FIG. 4 shows an example of a temperature compensation particle according to the invention.

As shown in FIG. 4, the low magnitude temperature coefficient may be the result of the particle 10 comprising materials with temperature coefficients which counteract each other, such as a first material 11 with a temperature coefficient of opposite sign to the temperature coefficient of a second material 12. For example, ilmenite has a dielectric constant of 16 at 25° C., +120 ppm/° C. and barium polytitanate has a dielectric constant of 37 at 25° C., −25 ppm/° C. If these materials are mixed in the ratio of 1:3.191 then the effective permittivity of the mixture is 31.9899 over the temperature range 25-150° C. The temperature coefficient of the dielectric constant of the resulting mixture is reduced to 0.5 ppm, thereby reducing the temperature effect on the dielectric constant by a factor of 98%. Though this example mixture is made up of only two different materials, temperature compensation particles may comprise more than two different materials.

Another combination of materials resulting in a substantially temperature independent permittivity is the mixing of neodymium, samarium and other rare-earth oxides to form a compound with negligible dependence of dielectric constant over the temperature range −55 to +125° C.

A particle 10 with temperature independent magnetic permeability could also be formed from the mixing of a ferromagnetic or ferrimagnetic material with an antiferromagnetic material, provided that the curie temperature of the ferromagnetic or ferrimagnetic material exceeds the Neel temperature of the antiferromagnet. Examples of materials which could be mixed according to this scenario include iron (a ferromagnet) or iron oxide (a ferrimagnet) and chromium or manganese oxide.

The temperature compensation particles 10 may be selected for inherently having a desired temperature coefficient or may be designed and the product of a particle fabrication process.

There are a number of methods for fabricating temperature compensation particles 10 and methods are not limited to the following example.

In this example, two feeder materials with complementary properties, such as a first material 11 with positive temperature coefficient of permittivity and a second material 12 with negative temperature coefficient of permittivity, are selected. The ratio of the amount of first material 11 used in the fabrication process, relative to the second material 12, is such that the resultant particles will have substantially temperature independent permittivity.

Figure 5:
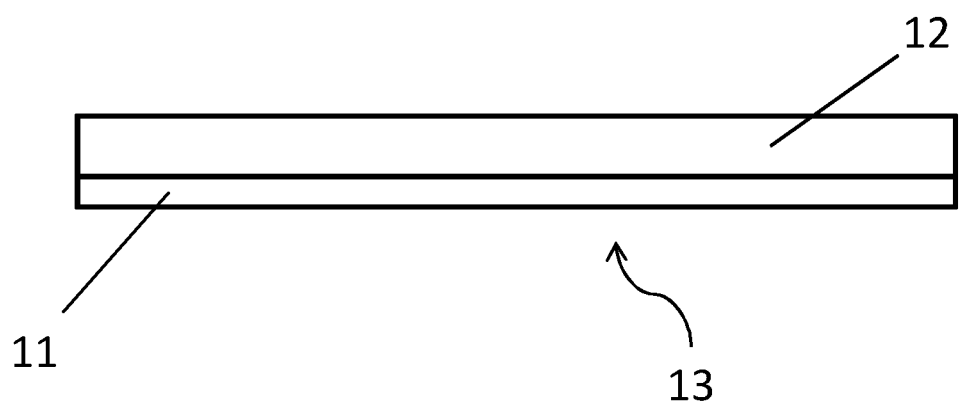
FIG. 5 shows an example of a composite material to be ground into temperature compensation particles.

A sheet, or multiple sheets, of the first material 11 is combined with a sheet, or multiple sheets, of the second material 12 to form a composite material 13. The materials may be combined through processes including, but not limited to, bonding, welding, fusing, growing and deposition. An example of a composite material 13 formed by the combination of a sheet of a first material 11 with a sheet of a second material 12 is shown in FIG. 5.

Once the composite material 13 has been formed, it may be fed into a grinder and ground into a powder comprising the temperature compensation particles 10. On average, the composition of each particle 10 of the powder will be the same as the ratio of the feeder materials and so the particles 10 will exhibit the net temperature dependence of the target property (in this case permittivity) as the mixture of materials used in their fabrication.

Optionally, the powder may be sintered to further control the shape and size of the temperature compensation particles 10.

The temperature compensation particles 10 may be arranged throughout the media 3 before the media 3 is applied to the PUF or after the media 3 is applied but before it has set.

The invention claimed is:

1. A physically unclonable function (PUF) device comprising:
   a plurality of conductors arranged such that each of the plurality of conductors interacts electrically, magnetically, or both, with at least one other of the plurality of conductors;
   a media surrounding at least a portion of each of the conductors,
      wherein the media includes a plurality of temperature compensation particles arranged throughout a volume of the media such that a permittivity of the media, a permeability of the media, or both, is temperature independent; and
   interface circuitry for applying an electrical challenge signal to at least one of the plurality of conductors and for receiving an electrical output signal in response to the electrical challenge signal from at least one separate conductor such that the electrical output signal is unique to the PUF device.

2. The PUF device of claim 1, wherein each of the plurality of temperature compensation particles comprises at least two different materials.

3. The PUF device of claim 2, wherein the at least two different materials includes at least a first material and a second material, wherein a first permittivity temperature coefficient of the first material has an opposite sign to a second permittivity temperature coefficient of the second material, a first permeability temperature coefficient of the first material has an opposite sign to a second permeability temperature coefficient of the second material, or both.

4. The PUF device of claim 2, wherein the at least two different materials of each temperature compensation particle are sintered together.

5. The PUF device of claim 1, wherein the plurality of temperature compensation particles are micro-particles, nano-particles, or both.

6. The PUF device of claim 1, wherein the plurality of conductors are at least one of electrically insulated wires overlapping one another, embedded within a substrate material with vias to allow for overlapping routing, and formed from a complex media of mixed permittivity, permeability, and conductivity.

7. The PUF device of claim 1, wherein the interface circuitry is configured to apply the electrical challenge signal to a varying selection of the plurality of conductors, receive the electrical output signal on a varying selection of the plurality of conductors, or both.

8. The PUF device of claim 1, wherein the interface circuitry is arranged to vary a number of conductors to which the electrical challenge signal is applied, vary a number of conductors from which the response is received after each challenge is applied, or both.

9. The PUF device of claim 1, wherein the interface circuitry is arranged to apply at least a second electrical challenge signal to at least one of the plurality of conductors and to receive at least a second electrical output from a different one of the plurality of conductors to generate an identifying response to the electrical challenge signal that is unique to the PUF device.

10. The PUF device of claim 9, wherein the electrical challenge signal is a first electrical challenge signal, and wherein the second electrical challenge signal is applied to a different set of the plurality of conductors than the first electrical challenge signal.

11. The PUF device of claim 9, wherein the second electrical output is received from a different set of the plurality of conductors than a first electrical output.

12. A method of fabricating temperature compensation particles arranged in a media that surrounds a plurality of conductors of a PUF device such that a permittivity and/or a permeability of the media is substantially temperature independent, the method comprising:
    forming a composite material by combining at least two different materials, the composite material having a temperature coefficient selected such that the permittivity and/or the permeability of the composite material is substantially temperature independent; and
    grinding the composite material into particles.

13. The method of claim 12, wherein a first permittivity temperature coefficient or a first permeability temperature coefficient of a first material of the at least two different materials has an opposite sign to a second permittivity temperature coefficient or a second permeability temperature coefficient of a second material of the at least two different materials.

14. The method of claim 12, wherein combining a first material and a second material comprises at least one of:
    bonding the first material to the second material;
    welding the first material to the second material;
    fusing the first material to the second material;
    growing the second material on the first material; or
    depositing the second material on to the first material.

* * * * *